United States Patent
Sommer et al.

(10) Patent No.: US 12,401,034 B2
(45) Date of Patent: Aug. 26, 2025

(54) MULTI-STEP PROCESS FOR MAKING CATHODE ACTIVE MATERIALS, AND CATHODE ACTIVE MATERIALS

(71) Applicant: BASF SE, Lugwigshafen am Rhein (DE)

(72) Inventors: Heino Sommer, Tuebingen (DE); Felix Florian Riewald, Ludwigshafen (DE); Philipp Kurzhals, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/037,663

(22) PCT Filed: Nov. 10, 2021

(86) PCT No.: PCT/EP2021/081174
§ 371 (c)(1),
(2) Date: May 18, 2023

(87) PCT Pub. No.: WO2022/106268
PCT Pub. Date: May 27, 2022

(65) Prior Publication Data
US 2023/0361294 A1    Nov. 9, 2023

(30) Foreign Application Priority Data
Nov. 20, 2020 (EP) .................... 20209036

(51) Int. Cl.
| | |
|---|---|
| *H01M 4/525* | (2010.01) |
| *C01G 53/66* | (2025.01) |
| *H01M 4/02* | (2006.01) |
| *H01M 4/04* | (2006.01) |
| *H01M 4/131* | (2010.01) |
| *H01M 4/62* | (2006.01) |
| *H01M 10/052* | (2010.01) |

(52) U.S. Cl.
CPC ........... *H01M 4/525* (2013.01); *C01G 53/66* (2013.01); *H01M 4/0471* (2013.01); *H01M 4/131* (2013.01); *H01M 4/625* (2013.01); *H01M 10/052* (2013.01); *C01P 2002/52* (2013.01); *C01P 2004/50* (2013.01); *C01P 2006/40* (2013.01); *H01M 2004/028* (2013.01)

(58) Field of Classification Search
CPC .................................................... H01M 4/525
See application file for complete search history.

(56) References Cited

U.S. PATENT DOCUMENTS

| | | | |
|---|---|---|---|
| 9,209,455 B2 * | 12/2015 | Ofer ................. | C01G 51/50 |
| 2006/0166091 A1 * | 7/2006 | Deguchi ............ | H01M 4/525 |
| | | | 429/231.1 |
| 2018/0040889 A1 | 2/2018 | Choi et al. | |
| 2022/0190326 A1 * | 6/2022 | Eom ................ | H01M 4/623 |
| 2023/0327104 A1 * | 10/2023 | Marin Florido ..... | H01M 4/364 |
| | | | 427/58 |

FOREIGN PATENT DOCUMENTS

EP    3315638    5/2018

OTHER PUBLICATIONS

International Search Report and Written Opinion from corresponding PCT International Application No. PCT/EP2021/081174 dated May 27, 2022.
Extended European Search Report dated May 10, 2021, of counterpart European Patent Application No. 20209036.1.

* cited by examiner

*Primary Examiner* — William D Young
(74) *Attorney, Agent, or Firm* — Armstrong Teasdale LLP

(57) ABSTRACT

The present invention is related to a process for making an electrode active material wherein said process comprises the following steps: (a) Providing a hydroxide $TM(OH)_2$ or at least one oxide TMO or at least one oxyhydroxide of TM or a combination of at least two of the foregoing wherein TM is one or more metals and contains at least 97 mol-% Ni and, optionally, in total up to 3 mol-% of at least one metal selected from Al, Ti, Zr, V, Co, Zn, Ba, and Mn; (b) mixing said hydroxide $TM(OH)_2$ or oxide TMO or oxyhydroxide of TM or combination with a source of lithium and a source of Mg wherein the molar amount of (Li+Mg) corresponds to 75 to 95 mol-% of TM; (c) treating the mixture obtained from step (b) thermally at a temperature in the range of from 450 to 650° C., thereby obtaining an intermediate; (d) mixing the intermediate from step (c) with a source of Li and with at least one compound of a metal $M^1$ selected from Al, Zr, Co, Mn, Nb, Ta, Mo, and W; (e) treating the mixture obtained from step (d) thermally at a temperature in the range of from 500 to 850° C.

15 Claims, No Drawings

MULTI-STEP PROCESS FOR MAKING CATHODE ACTIVE MATERIALS, AND CATHODE ACTIVE MATERIALS

The present invention is related to a process for making an electrode active material wherein said process comprises the following steps:

(a) Providing a hydroxide $TM(OH)_2$ or at least one oxide TMO or at least one oxyhydroxide of TM or a combination of at least two of the foregoing wherein TM is one or more metals and contains at least 97 mol-% Ni and, optionally, in total up to 3 mol-% of at least one metal selected from Al, Ti, Zr, V, Co, Zn, Ba, and Mn, (b) mixing said hydroxide $TM(OH)_2$ or oxide TMO or oxyhydroxide of TM or combination with a source of lithium and a source of Mg wherein the molar amount of (Li+Mg) corresponds to 75 to 95 mol-% of TM, (c) treating the mixture obtained from step (b) thermally at a temperature in the range of from 450 to 650° C., thereby obtaining an intermediate, (d) mixing the intermediate from step (c) with a source of Li and with at least one compound of a metal $M^1$ selected from Al, Zr, Co, Mn, Nb, Ta, Mo, and W, (e) treating the mixture obtained from step (d) thermally at a temperature in the range of from 500 to 850° C.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

A particularly Ni-rich material is $LiNiO_2$, sometimes abbreviated as LNO. However, pure LNO suffers from various drawbacks that have lowered interest in its commercial use. The most important among these drawbacks is the *difficile* synthesis of stoichiometric $LiNiO_2$ due to its tendency towards Li off-stoichiometry ($Li_{1-z}Ni_{1+z}O_2$) and various instability problems of its delithiated state, which can be of (electro)chemical, mechanical or thermal nature.

It was an objective of the present invention to provide a process for making Ni-rich electrode active materials with excellent electrochemical properties, especially with good capacity retention. It was also an objective to provide Ni-rich electrode active materials with excellent electrochemical properties.

Accordingly, the process defined at the outset has been found, hereinafter also referred to as inventive process. The inventive process comprises the following steps:

(a) providing a hydroxide $TM(OH)_2$ or at least one oxide TMO or at least one oxyhydroxide of TM or a combination of at least two of the foregoing wherein TM is one or more metals and contains at least 97 mol-% Ni and, optionally, in total up to 3 mol-% of at least one metal selected from Al, Ti, Zr, V, Co, Zn, Ba, and Mn, (b) mixing said hydroxide $TM(OH)_2$ or oxide TMO or oxyhydroxide of TM or combination with a source of lithium and a source of Mg wherein the molar amount of (Li+Mg) corresponds to 75 to 95 mol-% of TM, (c) treating the mixture obtained from step (b) thermally at a temperature in the range of from 450 to 650° C., thereby obtaining an intermediate, (d) mixing the intermediate from step (c) with a source of Li and with at least one compound of a metal $M^1$ selected from Al, Zr, Co, Mn, Nb, Ta, Mo, and W, (e) treating the mixture obtained from step (d) thermally at a temperature in the range of from 500 to 850° C.

Thus, the inventive process comprises five steps, (a), (b), (c), (d), and (e), in the context of the present invention also referred to as step (a) and step (b) and step (c) and step (d) and step (e), respectively. The five steps are preferably performed subsequently.

The inventive process starts off from a hydroxide $TM(OH)_2$ or at least one oxide TMO or at least one oxyhydroxide of TM or a combination of at least two of the foregoing. In such hydroxide $TM(OH)_2$ or at least one oxide TMO or oxyhydroxide of TM, TM contains at least 97 mol-% Ni, preferably at least 99 mol-% Ni and, optionally, in total up to 3 mol-%, preferably only up to 1 mol-% of at least one metal selected from Ti, Zr, V, Co, Zn, Ba, and Mn. More preferably, TM contains at least 99.5 mol-% of Ni and, optionally, in total up to 0.5 mol-% of at least one metal selected from Ti, Zr, and Co, and only traces of V, Zn, Ba, and Mn. Even more preferably, TM is Ni. The amount and kind of metals such as Ti, Zr, V, Co, Zn, Ba, and Mn may be determined by inductively coupled plasma ("ICP") and by synchrotron XRD. $TM(OH)_2$ or TMO or oxyhydroxide of TM provided in step (a) is preferably comprised of spherical particles, referring to particles that have a spherical shape. Spherical particles shall include not just those which are exactly spherical but also those particles in which the maximum and minimum diameter of at least 90% (number average) of a representative sample differ by not more than 10%.

In one embodiment of the present invention, $TM(OH)_2$ or TMO or oxyhydroxide of TM provided in step (a) is comprised of secondary particles that are agglomerates of primary particles. Preferably, $TM(OH)_2$ or TMO or oxyhydroxide of TM provided in step (a) is comprised of spherical secondary particles that are agglomerates of primary particles. Even more preferably, $TM(OH)_2$ or TMO or oxyhydroxide of TM provided in step (a) is comprised of spherical secondary particles that are agglomerates of spherical primary particles or platelets.

In one embodiment of the present invention, $TM(OH)_2$ or TMO or oxyhydroxide of TM provided in step (a) has an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material.

In embodiments wherein TM contains in total up to 3 mol-% of at least one metal selected from Ti, Zr, V, Co, Zn, Ba, or Mn, and combinations of at least two of the foregoing, preferred are Al and Zr. Said Al, Ti, Zr, V, Co, Zn, Ba, or Mn or combinations of at least two of the foregoing may be homogeneously distributed within the particles of $Ni(OH)_2$ or NiO or nickel oxyhydroxide or enriched at the surface, preference being giving to a homogeneous distribution.

$TM(OH)_2$ as provided in step (a) may be manufactured by precipitation of Ni and—if applicable—in total up to 3 mol-% of at least one metal selected from Al, Ti, Zr, V, Co, Zn, Ba, or Mn with alkali metal hydroxide from an aqueous solution of nickel sulfate that contains, if desired, at least one compound of said metal(s) selected from Al, Ti, Zr, V, Co, Zn, Ba, or Mn, followed by filtration and drying.

TMO and oxyhydroxide of TM as provided in step (a) may be manufactured by heating $TM(OH)_2$ and thus removing water.

Oxyhydroxide of TM is meant to include non-stoichiometric oxyhydroxides, with water bound chemically as hydroxide or with residual moisture content.

In step (b), said hydroxide $TM(OH)_2$ or oxide TMO or oxyhydroxide of TM or combination provided in step (a) is mixed with a source of lithium and a source of Mg wherein the molar amount of (Li+Mg) corresponds to 75 to 95 mol-% of TM.

Examples of sources of lithium are inorganic compounds of lithium, for example $LiNO_3$, $Li_2O$, LiOH and $Li_2CO_3$, preference being given to $Li_2O$, LiOH and $Li_2CO_3$, water of crystallization being neglected in the context of the source of lithium, and even more preference being given to LiOH.

In one embodiment of the present invention, said source of lithium has an average particle diameter (D50) in the range of from 1 to 5 μm.

Examples of sources of Mg are magnesium nitrate, MgO, $MgCO_3$, $Mg(HCO_3)_2$ and $Mg(OH)_2$, preference being given to MgO and $Mg(OH)_2$, water of crystallization being neglected in the context of the source of magnesium. Even more preferred is $Mg(OH)_2$.

In one embodiment of the present invention, said source of magnesium has an average particle diameter (D50) in the range of from 50 nm to 1 μm, determinable by dynamic light scattering.

In one embodiment of step (b), a source of Al, Zr, Co, Mn, Nb, Ta, Mo, or W is added as well. Suitable sources of Al, Zr, Co, Mn, Nb, Ta, Mo, and W are described further down below.

In one embodiment of step (b), the molar ratio of Li to Mg is in the range of from 200:1 to 25:1, preferred are 100:1 to 30:1.

Step (b) may be performed as one operation but is preferred that step (b) comprises the sub-steps of mixing $TM(OH)_2$ or TMO or oxyhydroxide of TM or combination with said source of lithium followed by a sub-step of addition of a solution of source of magnesium. Said sub-steps shall be described in more detail below. It is preferred, though, to perform step (b) in one step or to first mix source of lithium with source of magnesium, sub-step (b1), followed by combination of the resultant mixture with $TM(OH)_2$ or TMO or oxyhydroxide of TM, sub-step (b2).

Step (b) may be performed by mixing the respective components in a mixer, for example in a plough-share mixer or in a tumble mixer. For laboratory scale experiments, ball mills and roller mills may be applied as well.

Step (b) may be performed with the addition of water or of an organic solvent but it is preferred to not add any organic solvent or water in sub-step (b) or in any sub-step.

Preferred duration of step (b) is in the range of from one to 60 minutes.

A mixture is obtained in step (b).

Sub-step (b1) may be performed by mixing source of lithium and source of magnesium in a mixer, for example in a plough-share mixer or in a tumble mixer. For laboratory scale experiments, ball mills and roller mills may be applied as well. A mixture is obtained from sub-step (b1). Subsequently to sub-step (b1), sub-step (b2) is performed. In sub-step (b2), hydroxide $TM(OH)_2$ or TMO or oxyhydroxide of TM or combination a source of Mg is added to the mixture from sub-step (b1).

Sub-steps (b1) and (b2) may be performed with the addition of water or of an organic solvent but it is preferred to not add any organic solvent or water in sub-step (b1). Preferred duration of sub-step (b1) and sub-step (b2) is in the range of from one to 30 minutes.

It is possible to perform sub-step (b) under heating but it is preferred to not perform additional heating in the course of step (b).

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

In one embodiment of the present invention, step (b) is performed by charging a vessel with mixture of $TM(OH)_2$ or oxide TMO or oxyhydroxide of TM and with source of lithium and then said source of Mg.

In one embodiment of the present invention, in step (b) a source of aluminum is added as well. Suitable sources are, e.g., $Al(NO_3)_3$, $Al_2O_3$, $Al(OH)_3$, AlOOH, $Al_2O_3 \cdot aq$, preference being given to AlOOH and $Al_2O_3$, especially $\gamma$-$Al_2O_3$. Said source of aluminum may be added as aqueous solution, aqueous slurry or in particulate form, particulate form being preferred.

In one embodiment of the present invention, said source of Al has an average particle diameter (D50) in the range of from 0.5 to 5 μm, determinable by dynamic light scattering.

In one embodiment of the present invention, the amount of source of Al is in a way that the molar ratio od Mg and Al is in the range of from 5:1 to 1:5.

Step (c) includes treating the mixture obtained from step (b) thermally at a temperature in the range of from 450 to 650° C., preferably 475 to 575° C.

Step (c) may be carried out in any type of oven, for example a roller hearth kiln, a pusher kiln, a rotary kiln, a pendulum kiln, or—for lab scale trials—in a muffle oven.

The temperature of 450 to 650° C. corresponds to the maximum temperature of step (c).

It is possible to subject the mixture obtained from step (b) directly to step (c). However, it is preferred to increase the temperature stepwise, or to ramp up the temperature. Said stepwise increase or ramping up may be performed under normal pressure or reduced pressure, for example 1 to 500 mbar.

Step (c)—at its maximum temperature—may be performed under normal pressure.

Step (c) is carried out under an oxygen-containing atmosphere, for oxygen-enriched air with at least 80 vol-% of oxygen, or under pure oxygen.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (c) under an atmosphere with a carbon dioxide content below detection limit for example with infrared light-based optical methods.

In one embodiment of the present invention, step (c) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (c) of the present invention is performed under a forced flow of gas, for example air, oxygen and oxygen-enriched air. Such stream of gas may be termed a forced gas flow. Such stream of gas may have a specific flow rate in the range of from 0.5 to 15 m$^3$/h·kg mixture from step (b). The volume is determined under normal conditions: 298 Kelvin and 1 atmosphere. Said forced flow of gas is useful for removal of gaseous cleavage products such as water.

In one embodiment of the present invention, step (c) has a duration in the range of from two to 30 hours. Preferred are 10 to 24 hours. The cooling time is neglected in this context.

By performing step (c), an intermediate is obtained. Said intermediate is preferably allowed to cool down to ambient temperature.

Step (d) includes mixing the intermediate from step (c) with a source of Li and with at least one compound of a metal $M^1$ selected from Al, Co, Mn, Nb, Ta, Mo, Zr, and W, and combinations of at least two of the foregoing. Preferred are Al, Co, Zr and combinations of at least two of the foregoing. Such compounds of $M^1$ may be nitrates or halides but oxides, hydroxides and oxyhydroxides are preferred.

In one embodiment of the present invention, the molar ratio of $M^1$ to TM is in the range of from 1:33 to 1:500, preferably from 1:50 to 1:250. Said molar ratio is the total molar ratio and refers—incase at least two elements $M^1$ are selected—to all elements $M^1$.

Examples of sources of lithium in step (d) are like in step (b), thus, inorganic compounds of lithium, for example $LiNO_3$, $Li_2O$, LiOH and $Li_2CO_3$, preference being given to $Li_2O$, LiOH and $Li_2CO_3$, water of crystallization being neglected in the context of the source of lithium, and even more preference being given to LiOH in both steps (b) and (d).

Examples of sources of Al are $Al(NO_3)_3$, $Al_2O_3$, $Al(OH)_3$, AlOOH, $Al_2O_3$·aq, preference being given to $Al(OH)_3$, AlOOH and $Al_2O_3$, especially γ-$Al_2O_3$.

Examples of sources of Co are $Co(NO_3)_2$, $Co(OH)_2$, CoO, $CoCO_3$, $Co_3O_4$ and $Co_2O_3$, preferred are $Co(OH)_2$, CoO, $Co_3O_4$ and $Co_2O_3$.

Examples of sources of Mn are $MnCO_3$, $MnO_2$, $MnO_2$ being preferred.

Examples of sources of Nb are $Nb_2O_3$, $Nb_2O_5$ and niobic acid, $Nb_2O_5$·$H_2O$. In niobic acid, the amount of water is not necessarily stoichiometric.

Examples of sources of Ta are Ta, $Ta_2O_3$, $Ta_2O_5$.

Examples of sources of Mo are Mo, $MoO_3$, $Li_2MoO_4$.

Examples of sources of W are W, $WO_3$, $Li_2WO_4$.

Examples of sources of Zr are $ZrO_2$, $ZrO(OH)_2$, and $Zr(OH)_4$.

In one embodiment of the present invention, the average diameter (D50) of sources of $M^1$ is preferably in the range of from 10 nm to 100 μm, preferably 20 nm to 20 μm. Preferred are so-called nanoparticulate oxides or hydroxides of $M^1$ with an average diameter (D50) in the range of from 10 to 50 nm, and in general oxides or hydroxides of $M^1$ for example with an average diameter (D50) from 100 nm to 2 μm, measured by LASER diffraction or dynamic light scattering ("DLS"). Nanometals such as Ta, Mo and W are suitable as well, with an average diameter (D50) in the range of from 10 to 50 nm.

The stoichiometry in step (d) may be selected in a way that the total molar ratio (Li+Mg) to (TM+$M^1$) is in the range of from 1:1 to 1.05:1.

The mixing may be performed in analogy to step (b) mutatis mutandis.

Step (e) includes treating the mixture obtained from step (d) thermally at a temperature in the range of from 500 to 850° C.

Step (e) may be carried out in any type of oven, for example a roller hearth kiln, a pusher kiln, a rotary kiln, a pendulum kiln, or—for lab scale trials—in a muffle oven.

The temperature of 500 to 850° C. corresponds to the maximum temperature of step (e).

It is possible to subject the mixture obtained from step (d) directly to step (e). However, it is preferred to increase the temperature stepwise, or to ramp up the temperature. Said stepwise increase or ramping up may be performed under normal pressure or reduced pressure, for example 1 to 500 mbar.

Step (e)—at its maximum temperature—may be performed under normal pressure.

Step (e) is carried out under an oxygen-containing atmosphere, for oxygen-enriched air with at least 80 vol-% of oxygen, or under pure oxygen.

In one embodiment of the present invention, step (e) has a duration in the range of from two to 30 hours. Preferred are 6 to 24 hours. The cooling time is neglected in this context.

The temperature intervals of steps (c) and (e) are overlapping. In one embodiment of the present invention, the temperature in step (e) is higher than in step (c), for example by at least 50° C. In embodiments where step (c) is performed at 600 or even 650° C., step (e) is preferably performed at a temperature of 650 to 800° C. or 700 to 800° C., respectively.

By performing step (e), an electrode active material is obtained. Said intermediate is preferably allowed to cool down to ambient temperature.

The inventive process may include further—optional—steps, for example de-agglomeration after step (c) or (e) or both, or a step of washing with water to remove residual lithium that may be present as unreacted base subsequently to step (e).

By carrying out the inventive process, electrode active materials are obtained with excellent electrochemical properties. Without wishing to be bound by any theory, we assume that the magnesium is incorporated in the lithium layer.

A further aspect of the present invention relates to an electrode active material, hereinafter also referred to as inventive electrode active material. Inventive electrode active material is in particulate form and has the general formula $(Li_aMg_b)_{1+x}(TM_cM^1_d)_{1-x}O_2$, wherein TM contains at least 97 mol-% Ni and, optionally, up to 3 mol-% of at least one metal selected from Al, Ti, Zr, V, Co, Zn, Ba, or Mn.

$M^1$ is selected from Al, Co, Mn, Nb, Ta, Mo, and W, a:b is in the range of from 40:1 to 200:1, and a+b=1 c:d is in the range of from 50:1 to 250:1, and c+d=1, 0.00<x 0.05, thus, the total molar ratio of (Li+Mg) to (TM+$M^1$) is in the range of from 1:1 to 1.05:1, Preferably, TM contains at least 99 mol-% of Ni and, optionally, in total up to 1.0 mol-% of at least one metal selected from Al, Ti, Zr, Co, V, Zn, Ba, and Ca. More preferably, TM contains at least 99.5 mol-% of Ni and, optionally, in total up to 0.5 mol-% of at least one metal selected from Ti, Zr, and Co, and only traces of V, Zn, Ba, and Mn. Even more preferably, TM is Ni.

In embodiments wherein TM contain at least 99 mol-% Ni and in total up to 1 mol-% of at least one metal selected from Al, Ti, Zr, V, Co, Zn, Ba, or Mn, said Ti, Zr, V, Co, Zn, Ba, or Mn or combinations of at least two of the foregoing may be homogeneously distributed within the particles of $Ni(OH)_2$ or enriched at the surface, preference being giving to a homogeneous distribution.

Preferably, Ni is Ni or the Ti, Zr, V, Co, Zn, Ba, or Mn are homogeneously distributed in TM, and $M^1$ is coated on the outer surface or displays a concentration gradient.

In one embodiment of the present invention inventive electrode active materials have an average particle diameter (D50) in the range of from 3 to 20 μm, preferably from 5 to 16 μm. The average particle diameter may be determined, e.g., by light scattering or LASER diffraction or electroacoustic spectroscopy. The particles are usually composed of agglomerates from primary particles, and the above particle diameter refers to the secondary particle diameter.

In one embodiment of the present invention inventive electrode active materials have a specific surface (BET) in the range of from 0.1 to 2.0 $m^2/g$, determined according to DIN-ISO 9277:2003-05.

A further aspect of the present invention refers to electrodes comprising at least one electrode active material according to the present invention. They are particularly useful for lithium ion batteries. Lithium ion batteries comprising at least one electrode according to the present invention exhibit a good discharge behavior. Electrodes comprising at least one electrode active material according to the present invention are hereinafter also referred to as inventive cathodes or cathodes according to the present invention.

Specifically, inventive cathodes contain
(A) at least one inventive electrode active material,
(B) carbon in electrically conductive form,
(C) a binder material, also referred to as binders or binders (C), and, preferably,
(D) a current collector.

In a preferred embodiment, inventive cathodes contain
(A) 80 to 98% by weight inventive electrode active material,
(B) 1 to 17% by weight of carbon,
(C) 1 to 15% by weight of binder material,
percentages referring to the sum of (A), (B) and (C).

Cathodes according to the present invention can comprise further components. They can comprise a current collector, such as, but not limited to, an aluminum foil. They can further comprise conductive carbon and a binder.

Cathodes according to the present invention contain carbon in electrically conductive modification, in brief also referred to as carbon (B). Carbon (B) can be selected from soot, active carbon, carbon nanotubes, graphene, and graphite, and from combinations of at least two of the foregoing.

Suitable binders (C) are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol-% of copolymerized ethylene and up to 50 mol-% of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol-% of copolymerized propylene and up to 50 mol-% of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co)polymers which have an average molecular weight $M_w$ in the range from 50,000 to 1,000,000 g/mol, preferably to 500,000 g/mol.

Binder (C) may be cross-linked or non-cross-linked (co)polymers.

In a particularly preferred embodiment of the present invention, binder (C) is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoridetetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol-% of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (III)

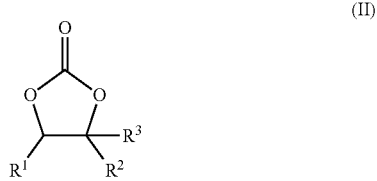

(II)

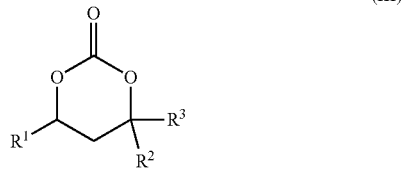

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

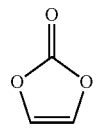

(IV)

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the present invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

Average particle diameters (D50) were determined by dynamic light scattering ("DLS"). Percentages are % by weight unless specifically noted otherwise.

LiOH·OH was purchased from Rockwood Lithium. $Mg(OH)_2$ was purchased from Sigma Aldrich, $Al_2O_3$ was purchased from Sasol, and $Zr(OH)_4$ from Luxfer Mel Technologies As a mixer, a blender (Kinematica) was used.

I. Manufacture of a Base Cathode Active Material, $LiNiO_2$

I.1 Manufacture of a Precursor

Step (a.1): A spherical $Ni(OH)_2$ precursor was obtained by combining aqueous nickel sulfate solution (1.65 mol/kg solution) with an aqueous 25 wt. % NaOH solution and using ammonia as complexation agent. The pH value was set at 12.6. The freshly precipitated $Ni(OH)_2$ was washed with water, sieved and dried at 120° C. for 12 hours. The resultant $Ni(OH)_2$ ("P-CAM.1") had an average particle diameter D50 of 10 µm.

II. Manufacture of Inventive Cathode Active Materials, and of Comparative Cathode Active Materials II.1 Manufacture of C-CAM.1

Step (b.1): An amount of 50 g of P-CAM.1 was mixed with 22.80 g $LiOH·H_2O$, 0.32 g $Mg(OH)_2$, 0.15 g $Al_2O_3$ and 0.25 g $Zr(OH)_4$.

Step (c.1): The resultant mixture was poured into an alumina crucible and heated to 600° C. for one hour and then to 700° C. for 6 hours under oxygen atmosphere (10 exchanges/hour) with a heating rate of 10° C. $min^{-1}$ for the first temperature ramp and 3° C. $min^{-1}$ for the second ramp. Said heat treatment was performed in laboratory furnace (Linn High Therm). C-CAM.1 was obtained. C-CAM.1 was cooled to 120° C. at a cooling rate of 10° C. $min^{-1}$ and transferred into a dry room for further processing.

Neither a step (d) nor (e) was performed.

Subsequently, the resultant C-CAM.1 was sieved using a mesh size of 32 µm to C-CAM.1 with 1.0 mol % Mg, 0.55 mol % Al, 0.24 mol % Zr and molar ratio (Li+Mg)/(Ni+Al+Zr)=1.01.

II.2 Manufacture of CAM.2

Step (b.2): An amount of 50 g of P-CAM.1 was mixed with 17.67 g $LiOH·H_2O$, 0.25 g $Mg(OH)_2$, and 0.15 g $Al_2O_3$.

Step (c.2): The resultant mixture was poured into quartz glass bulb that was part of a rotary kiln and heated to 600° C. for one hour under oxygen atmosphere (100 exchanges/hour) with a heating rate of 10° C. $min^{-1}$. The rotational speed was 20 rpm. An intermediate was obtained. The resultant intermediate was cooled to ambient temperature at a cooling rate of 10° C. $min^{-1}$ and transferred into a dry room for further processing. The composition was 63 wt % Ni, 0.13 wt % Al, 0.18 wt % Mg and 5.51 wt % Li.

Step (d.2): An amount of 40 g of the intermediate from step (c.2) was mixed with 5.23 g Li—$OH·H_2O$, 0.09 g $Mg(OH)_2$ and 0.21 g $Zr(OH)_4$ using a blender. A mixture was obtained.

Step (e.2): The mixture from step (d.2) was poured into an alumina crucible and heated to 700° C. for 6 hours under oxygen atmosphere (10 exchanges/hour) with a heating rate of 3° C. $min^{-1}$ in a laboratory furnace. The resultant CAM.2 was cooled to 120° C. at a cooling rate of 10° C. $min^{-1}$ and transferred to a dry room for further processing.

Subsequently, CAM.2 was sieved using a mesh size of 32 µm with 0.70 mol % Mg, 0.45 mol % Al, 0.24 mol % Zr and molar ratio (Li+Mg)/(Ni+Al+Zr)=1.02 (measured by ICP-OES).

II.3 Manufacture of CAM.3

Step (b.3): An amount of 50 g of P-CAM.1 was mixed with 17.67 g $LiOH·H_2O$, 0.25 g $Mg(OH)_2$, and 0.15 g $Al_2O_3$.

Step (c.3): The resultant mixture was poured into an alumina crucible and heated to 600° C. for one hour and then to 700° C. for 6 hours under oxygen atmosphere (10 exchanges/hour) with a heating rate of 10° C. $min^{-1}$ for the first temperature ramp and 3° C. $min^{-1}$ for the second ramp. Said heat treatment was performed in laboratory furnace (Linn High Therm). An intermediate was obtained. The resultant intermediate was cooled to ambient temperature at a cooling rate of 10° C. $min^{-1}$ and transferred into a dry room for further processing. The composition was 63 wt % Ni, 0.15 wt % Al, 0.21 wt % Mg and 5.79 wt % Li.

Step (d.3): An amount of 40 g of the intermediate from step (c.3) was mixed with 4.37 g $LiOH·H_2O$, 0.06 g $Mg(OH)_2$ and 0.21 g $Zr(OH)_4$ using a blender. A mixture was obtained.

Step (e.3): The mixture from step (d.2) was poured into an alumina crucible and heated to 700° C. for 6 hours under oxygen atmosphere (10 exchanges/hour) with a heating rate of 3° C. $min^{-1}$ in a laboratory furnace. The resultant CAM.3 was cooled to 120° C. at a cooling rate of 10° C. $min^{-1}$ and transferred to a dry room for further processing.

Subsequently, CAM.3 was sieved using a mesh size of 32 μm with 0.8 mol % Mg, 0.5 mol % Al, 0.24 mol % Zr and molar ratio (Li+Mg)/(Ni+Al+Zr)=1.01 (measured by ICP-OES).

III. Electrochemical Testing

III.1 Cathode Manufacture, General Protocol:

Electrode manufacture: Electrodes contained 94% of the respective CAM or C-CAM.1, 3% carbon black (Super C65) and 3% binder (polyvinylidene fluoride, Solef 5130). Slurries with a total solids content of 61% were mixed in N-methyl-2-pyrrolidone (planetary mixer, 24 minutes, 2,000 rpm) and cast onto aluminum foil tape by a box-type coater. After drying of the electrode tapes for 16 h at 120° C. in vacuo and calendaring, circular electrodes with a diameter of 14 mm were punched, weighed and dried at 120° C. under vacuum for 12 hours before entering in an Ar filled glove box. Average loading: 8 mg/cm$^2$, electrode density: 3 g/cm$^3$.

III.2 Coin Cell Manufacture

Coin-type electrochemical cells were assembled in an argon-filled glovebox. Anode: 0.58 mm thick Li foil, separated from the cathode by a glass fiber separator (Whatman GF/D). An amount of 95 μl of 1 M LiPFe$_6$ in ethylene carbonate (EC):ethylmethyl carbonate (EMC), 3:7 by weight, was used as the electrolyte. After assembly, the cells were crimped closed in an automated crimper. The cells were then transferred to a climate chamber and connected to a battery cycler (Series4000, MACCOR).

III.3 Coin Cell Testing.

All tests were performed at 25° C. Cells were galvanostatically cycled at a Maccor 4000 battery cycler between 3.1 and 4.3 V at room temperature by applying the following C-rates until 70% of the initial discharge capacity is reached at a certain discharge step:

The test protocol consisted of an initial formation & rate test part, starting with two cycles at C/10. For all cycles, the voltage window was set to 3.0-4.3 V. As an initial 1C rate, 200 mA g$^{-1}$ were assumed. For all subsequent cycles, the charge was set to CCCV at C/2 and 4.3 V for 30 min or until the current drops below C/100. The cells were discharged at C/5 for five cycles before stepwise increasing the discharge rate (C/10, C/5, C/2, 1C, 2C, 3C). The 1C rate was then adapted to the capacity of the 1C discharge. Following the rate test, the state of charge dependent cell resistance was determined by the DCIR method. After a short potential relaxation, a current pulse of 400 mA g$^{-1}$ is applied for 10 s. Following each current pulse, the cell is discharged at C/5 for 30 min before repeat until the cell voltage drops below 3 V. After this initial period, the cells were alternatively cycled for two cycles at C/10 discharge and 50 cycles at 1C discharge. In each second C/10 cycle, the cell potential was relaxed for 5 min at 100, 50 and 25% SOC before applying a 30 s current pulse at 100 mA g$^{-1}$ to calculate the cell resistance by the DCIR method, 2.5C rate discharge pulse for 30 minutes.

TABLE 1

Capacities from Coin Half Cell testing

| sample | 1$^{st}$ cycle charge/ mAh g$^{-1}$ 0.1 C | 1$^{st}$ cycle discharge/ mAh g$^{-1}$ 0.1 C | 2$^{nd}$ cycle discharge/ mAh g$^{-1}$ 0.1 C | 11$^{th}$ cycle discharge/ mAh g$^{-1}$ 1 C | 15$^{th}$ cycle discharge/ mAh g$^{-1}$ 0.1 C retention |
|---|---|---|---|---|---|
| C-CAM.1 | 245.9 | 201.6 | 206.1 | 191.0 | 203.5 |
| CAM.2 | 251.8 | 215.9 | 220.6 | 201.4 | 212.7 |
| CAM.3 | 249.1 | 209.8 | 216.4 | 198.0 | 210.5 |

The invention claimed is:

1. A particulate electrode active material according to the general formula $(Li_aMg_b)_{1+x}(TM_cM^1_d)_{1-x}O_2$, wherein
    TM contains at least 97 mol-% Ni and, optionally, up to 1 mol-% of at least one metal selected from Ti, Al, Zr, V, Co, Zn, Ba, and Mn,
    M$^1$ is selected from Al, Zr, Co, Mn, Nb, Ta, Mo, and W, wherein M$^1$ comprises at least one of Al, Zr, Nb, Ta, Mo, and W,
    a:b is in the range of from 40:1 to 200:1, and a+b=1,
    c:d is in the range of from 50:1 to 250:1, and c+d=1,
    total molar ratio of (Li+Mg) to (TM+M$^1$) is in the range of from 1:1 to 1.05:1, $0.00 \leq x \leq 0.05$;

wherein said electrode active material is comprised from secondary particles that are agglomerates of primary particles, and M$^1$ is enriched at the surface of the primary particles.

2. The particulate electrode active material according to claim 1, wherein TM is nickel.

3. The particulate electrode active material according to claim 1, wherein M$^1$ comprises Al, Zr or combinations thereof.

4. A process for making the particulate electrode active material according to claim 1, wherein said process comprises the following steps:
    (a) providing a hydroxide TM(OH)$_2$ or at least one oxide TMO or at least one oxyhydroxide of TM or a combination of at least two of the foregoing wherein TM is one or more metals and contains at least 97 mol-% Ni and, optionally, in total up to 1 mol-% of at least one metal selected from Al, Ti, Zr, V, Co, Zn, Ba, and Mn,
    (b) mixing said hydroxide TM(OH)$_2$ or oxide TMO or oxyhydroxide of TM or combination with a source of lithium and a source of Mg wherein the molar amount of (Li+Mg) corresponds to 75 to 95 mol-% of TM,
    (c) treating the mixture obtained from step (b) thermally at a temperature in the range of from 450 to 650° C., thereby obtaining an intermediate,
    (d) mixing the intermediate from step (c) with a source of Li and with at least one compound of a metal M$^1$ selected from Al, Zr, Co, Mn, Nb, Ta, Mo, and W, wherein M$^1$ comprises at least one of Al, Zr, Nb, Ta, Mo, and W, and
    (e) treating the mixture obtained from step (d) thermally at a temperature in the range of from 500 to 850° C.

5. The process according to claim 4, wherein the total molar ratio of (Li+Mg) to (TM+M$^1$) is in the range of from 1:1 to 1.05:1.

6. The process according to claim 4, wherein in step (b), the molar ratio of Li to Mg is in the range of from 200:1 to 25:1.

7. The process according to claim 4, wherein the source of Mg is selected from Mg(OH)$_2$ and MgO.

8. The process according to claim 4, wherein in step (b), a source of Al is added.

9. The process according to claim 4, wherein the temperature in step (e) is higher than in step (c).

10. The process according to claim 4, wherein steps (c) and (e) are performed in an atmosphere of at least 80 vol-% oxygen.

11. The process according to claim 4, wherein the molar ratio of $M^1$ to TM is in the range of from 1:50 to 1:250.

12. The process according to claim 4, wherein the at least one compound of a metal $M^1$ is selected from the group consisting of oxides of $M^1$, hydroxides of $M^1$, and oxyhydroxides of $M^1$.

13. A cathode containing
    (A) at least one electrode active material according to claim 1,
    (B) carbon in electrically conductive form, and
    (C) a binder material.

14. The cathode according to claim 13 containing
    (A) 80 to 98% by weight cathode active material,
    (B) 1 to 17% by weight of carbon, and
    (C) 3 to 10% by weight of binder material,
    percentages referring to the sum of (A), (B) and (C).

15. An electrochemical cell containing at least one cathode according to claim 13.

\* \* \* \* \*